US009255386B2

(12) United States Patent
Kikuchi et al.

(10) Patent No.: US 9,255,386 B2
(45) Date of Patent: Feb. 9, 2016

(54) CONSTRUCTION MACHINE

(75) Inventors: Keigo Kikuchi, Ryuugasaki (JP); Koji Hyodo, Kasumigaura (JP); Isamu Aoki, Tsukuba (JP); Tetsuji Tanaka, Abiko (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 2 days.

(21) Appl. No.: 14/000,633

(22) PCT Filed: Mar. 5, 2012

(86) PCT No.: PCT/JP2012/055602
§ 371 (c)(1),
(2), (4) Date: Aug. 21, 2013

(87) PCT Pub. No.: WO2012/124530
PCT Pub. Date: Sep. 20, 2012

(65) Prior Publication Data
US 2013/0319786 A1    Dec. 5, 2013

(30) Foreign Application Priority Data
Mar. 15, 2011 (JP) ................................. 2011-057090

(51) Int. Cl.
*F28F 27/00* (2006.01)
*E02F 9/22* (2006.01)
(Continued)

(52) U.S. Cl.
CPC .............. *E02F 9/22* (2013.01); *B60H 1/00378* (2013.01); *B60H 1/00828* (2013.01);
(Continued)

(58) Field of Classification Search
CPC ................ F04D 19/005; B60H 1/3213; B60H 2001/3248; F25B 841/04; F25B 2700/1931; F25B 2400/0403

USPC .......................................... 180/306; 165/281
See application file for complete search history.

(56) References Cited

U.S. PATENT DOCUMENTS 3,664,129 A * 5/1972 Schwab ........................... 60/451
4,535,729 A * 8/1985 Faylor ........................... 123/41.1
(Continued)

FOREIGN PATENT DOCUMENTS

JP        10-068142 A      3/1998
JP     2001-182535 A      7/2001
(Continued)

OTHER PUBLICATIONS

International Preliminary Report on Patentability received in International Application No. PCT/JP2012/055602 dated Sep. 26, 2013.
(Continued)

*Primary Examiner* — Brodie Follman
*Assistant Examiner* — Brian Cassidy
(74) *Attorney, Agent, or Firm* — Mattingly & Malur, PC

(57) ABSTRACT

A construction machine includes a condenser 24 for cooling refrigerant for an air conditioner; a fan 21 for cooling the condenser 24 by using forward cooling air produced during normal-rotation drive; other cooled objects such as a radiator 25 and the like disposed under the lee of the forward cooling air with respect to the condenser 24; a refrigerant pressure detector 27 for detecting the pressure of the refrigerant flowing in the condenser 24; and a controller 136 for executing reverse-rotation stop processing for returning the fan 21 to the normal-rotation drive when the pressure P of the air conditioner refrigerant detected by the refrigerant pressure detector 27 reaches a preset normal-rotation return pressure P1 during reverse-rotation drive of the fan 21. Thus, the lowering of the cooling effect of an air conditioner can be suppressed while reducing the burden of cleaning an engine room.

7 Claims, 3 Drawing Sheets

(51) Int. Cl.
*E02F 9/08* (2006.01)
*E02F 9/20* (2006.01)
*B60H 1/00* (2006.01)
*B60H 1/32* (2006.01)

(52) U.S. Cl.
CPC .......... *B60H 1/3205* (2013.01); *E02F 9/0866* (2013.01); *E02F 9/0875* (2013.01); *E02F 9/2095* (2013.01); *E02F 9/226* (2013.01); *F28F 27/00* (2013.01); *B60H 2001/3251* (2013.01)

(56) References Cited

U.S. PATENT DOCUMENTS

| | | | |
|---|---|---|---|
| 5,226,285 A | 7/1993 | Dankowski | |
| 6,076,488 A | 6/2000 | Yamagishi | |
| 6,152,699 A * | 11/2000 | Shikata et al. | 417/12 |
| 6,349,882 B1 | 2/2002 | Kita et al. | |
| 6,354,089 B1 * | 3/2002 | Lech et al. | 62/50.2 |
| 8,104,559 B2 * | 1/2012 | Kisse | 180/68.1 |
| 2005/0183417 A1 | 8/2005 | Nakagawa et al. | |
| 2012/0318013 A1 * | 12/2012 | Hozumi et al. | 62/181 |
| 2013/0008246 A1 * | 1/2013 | Nelson et al. | 73/168 |

FOREIGN PATENT DOCUMENTS

| | | |
|---|---|---|
| JP | 2002-192959 A | 7/2002 |
| JP | 2002-337543 A | 11/2002 |
| JP | 2004-197681 A | 7/2004 |
| JP | 2005-232792 A | 9/2005 |
| JP | 2006-057599 A | 3/2006 |
| JP | 2006-063882 A | 3/2006 |
| JP | 2007-182710 A | 7/2007 |

OTHER PUBLICATIONS

Extended European Search Report received in corresponding European Application No. 12757634.6 dated Jun. 3, 2015.

* cited by examiner

CONSTRUCTION MACHINE

TECHNICAL FIELD

The present invention relates to a construction machine such as a wheel loader, a hydraulic excavator or the like.

BACKGROUND ART

Many construction machines such as wheel loaders and hydraulic excavators have working hydraulic actuators driven by hydraulic operating fluid from a hydraulic pump driven by an engine. Some construction machines of this type have the following function. A fan for sending cooling air to objects to be cooled, such as a radiator, a hydraulic operating fluid cooler and the like in an engine room is driven for reverse rotation. Reverse airflow generated in doing so removes the dust that adheres to a filter for dust removal and other objects to be cooled during the normal-rotation drive. Thus, the burden of cleaning the engine room is reduced (see patent document 1, etc.).

PRIOR ART DOCUMENTS

Patent Documents

Patent document 1: JP,A 2007-182710

SUMMARY OF THE INVENTION

Problem to be Solved by the Invention

Incidentally, in some construction machines having the above-described fan, a condenser for cooling refrigerant for an air conditioner installed in an engine room is located on the windy side of the radiator, the hydraulic operating fluid cooler, and the like so as to cool the refrigerant of the air conditioner by using the cooling air from the fan. With such a configuration, when the fan is driven for reverse rotation as described above, the condenser is under the lee of the radiator and other objects to be cooled. Thus, air striking the condenser is increased in temperature, lowering the effect of the air conditioner.

The present invention has been made in view of such situations and aims to provide a construction machine that can suppress the lowering of the cooling effect of an air conditioner while reducing the burden of cleaning an engine room.

Means for Solving the Problem (1) To achieve the above object, a construction machine is characterized by including a condenser for cooling a refrigerant for an air conditioner; a fan for cooling the condenser by using forward cooling air produced during normal-rotation drive; another cooled object disposed under the lee of the forward cooling air with respect to the condenser; a refrigerant pressure detector for detecting the pressure of the refrigerant flowing in the condenser; and a controller for executing reverse-rotation stop processing for returning the fan to normal-rotation drive when the pressure of the refrigerant detected by the refrigerant pressure detector reaches a preset normal-rotation return pressure during reverse-rotation drive of the fan.

(2) In the above (1), it is preferably characterized in that the controller executes, before the execution of the reverse-rotation stop processing, forced reverse-rotation processing for continuing the reverse-rotation drive of the fan regardless of the detected pressure of the refrigerant until a predetermined forced reverse-rotation period elapses after the reverse-rotation of the fan has been started.

(3) In the above (2), it is preferably characterized in that the controller has a function to execute automatic reverse-rotation processing in which the fan is driven for reverse rotation for a preset reverse-rotation period at regular time intervals, and the controller, during the execution of the automatic reverse-rotation processing, sequentially executes the forced reverse-rotation processing and the reverse-rotation stop processing and returns the fan to the normal-rotation drive after the reverse-rotation drive period elapses with the fan remaining driven for reverse rotation.

(4) In the above (2) or (3), it is preferably characterized by including a forced period setter for setting the forced reverse-rotation period or a connecting portion to which the forced period setter is connected.

(5) In any one of the above (2) to (4), it is preferably characterized by including changeover means for changing over validity and invalidity of the reverse-rotation stop processing.

(6) In any one of the above (2) to (5), it is characterized by further including an engine; a hydraulic pump for driving the engine; a hydraulic actuator driven by hydraulic operating fluid delivered from the hydraulic pump; a hydraulic operating fluid temperature detector for detecting temperature of the hydraulic operating fluid; a transmission for changing vehicle speed; a torque converter for transmitting drive force of the engine to the transmission; a torque converter oil temperature detector for detecting temperature of torque converter oil, which is a power transmission medium of the torque converter; a radiator as the other cooled object for cooling the cooling water of the engine; and an engine control unit for controlling and monitoring the engine; and in that the controller returns the fan to the normal-rotation drive regardless of elapse time after the start of the reverse rotation of the fan or the detection pressure of the refrigerant if any one of detection values of the hydraulic operating fluid temperature detector and the torque converter oil temperature detector reaches a corresponding one of respective preset values, or if the controller receives a signal for warning overheat of the engine from the engine control unit, during the reverse-rotation drive of the fan.

Effects of the Invention

The present invention can suppress the lowering of a cooling effect of the air conditioner while reducing the burden of cleaning the engine room.

MODE FOR CARRYING OUT THE INVENTION

Embodiments of the present invention will hereinafter be described with reference to the drawings.

Figure 1:
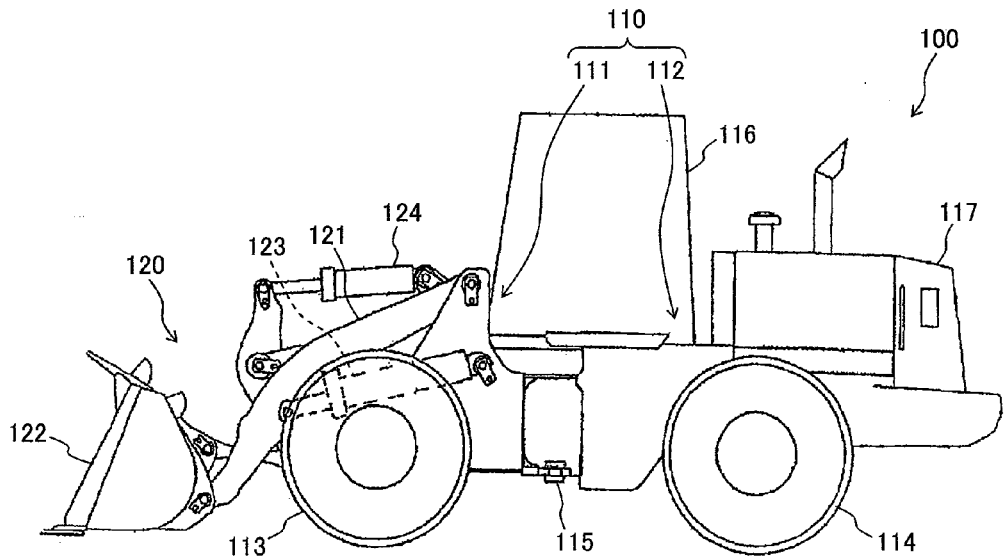
FIG. 1 is a side view of a wheel loader as an example of a construction machine according to an embodiment of the present invention.

FIG. 1 is a side view of a wheel loader as an example of a construction machine according to an embodiment of the present invention.

A wheel loader 100 illustrated in FIG. 1 includes a vehicle body 110 and a work implement 120 mounted on the front of the vehicle body 110.

The vehicle body 110 has a front vehicle body 111 and a rear vehicle body 112. The front vehicle body 111 and the rear vehicle body 112 have front wheels (tires) 113 and rear wheels (tires) 114, respectively, and are connected in a bendable manner with each other via a vertically extending center pin 115. Although not illustrated, steering cylinders are connected to the front vehicle body 111 and the rear vehicle body 112. The front vehicle body 111 is bent from side to side with respect to the rear vehicle body 112 along with the expansion-contraction drive of the steering cylinders. An operating room 116 and an engine room 117 are mounted on the front portion and rear portion, respectively, of the rear vehicle body 112. An engine 131 as a prime mover described later, a hydraulic pump 134 driven by the engine 131, a control valve 135 for controlling the direction and flow rate of hydraulic operating fluid discharged from the hydraulic pump 134, and other parts are accommodated in the engine room 117.

The work implement 120 has arms 121, a bucket 122, arm cylinders 123 for driving the arms 121 and a bucket cylinder 124 for driving the bucket 122. The arms 121 are vertically turned (raised or lowered) along the expansion-contraction drive of the arm cylinders 123. The bucket 122 is vertically turned (dumping action or crowding action) along with the expansion-contraction drive of the bucket cylinder 124.

Figure 2:
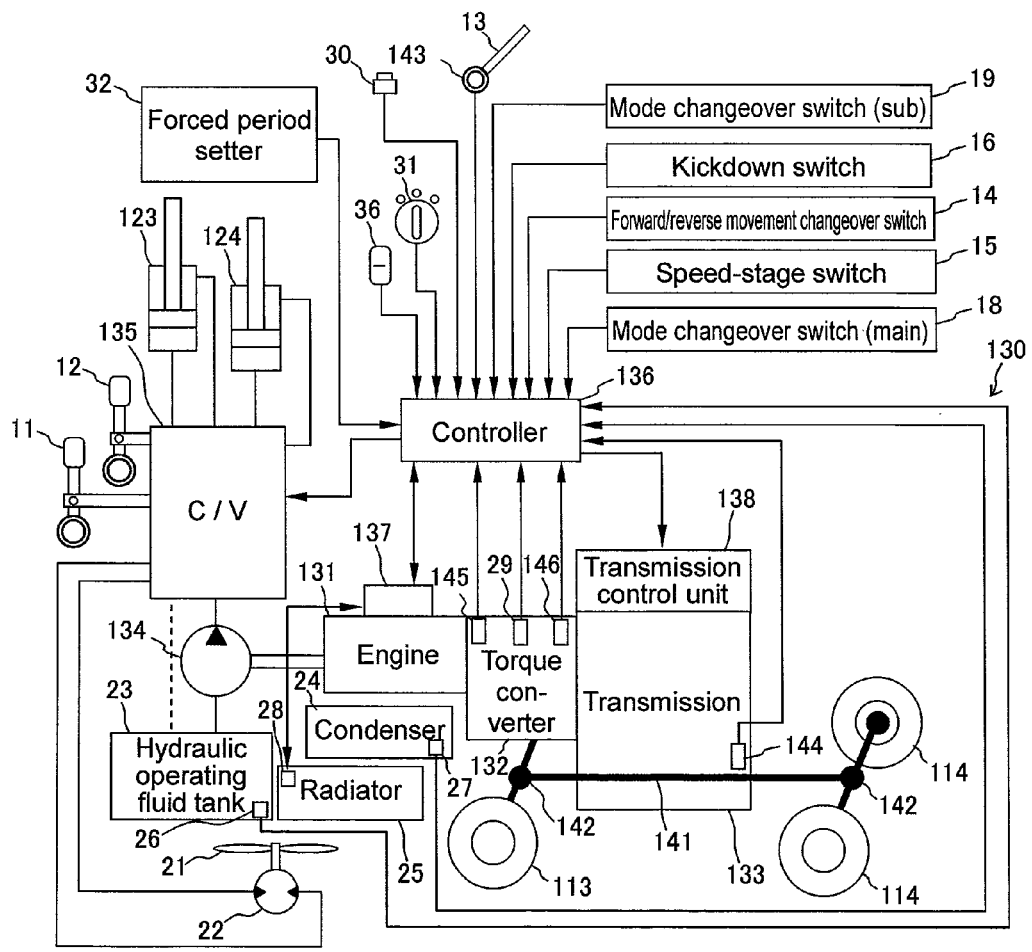
FIG. 2 is a block diagram illustrating a schematic configuration of a drive system incorporated in the wheel loader as an example of the construction machine according to the embodiment of the present invention.

FIG. 2 is a block diagram illustrating the schematic configuration of a drive system of the wheel loader 100.

As shown in FIG. 2, the drive system 130 of the wheel loader 100 includes the engine 131, a torque converter 132, a transmission 133, the hydraulic pump 134, the control valve 135, a controller 136, an engine control unit 137 and a transmission control unit 138.

The torque converter 132 has an input shaft coupled to the output shaft of the engine 131. In addition, the torque converter 132 has an output shaft coupled to the transmission 133. The torque converter 132 is a fluid clutch composed of an impeller, a turbine and a stator which are known in the art. The rotation of the engine 131 is transmitted to the transmission 133 via the torque converter 132. The transmission 133 has a hydraulic clutch for shifting its gearsets. The rotation of the output shaft of the torque convertor 132 is changed in speed by the transmission 133. The rotation having been changed in speed is transmitted to the front wheels 113 and the rear wheels 114 via a propeller shaft 141 and associated axles 142, whereby the wheel loader 100 travels.

The hydraulic pump 134 is of a variable displacement type and is driven by the engine 131 to suck and deliver the hydraulic operating fluid stored in a hydraulic operating fluid tank 23. The pump capacity of the hydraulic pump 134 is changed by a regulator (not shown). The regulator changes the pump capacity in response to pump delivery pressure to perform such constant torque control as to make e.g. working torque constant. Incidentally, also a fixed displacement hydraulic pump such as a gear pump or the like can be used as the hydraulic pump 134.

Although schematically illustrated, the control valve 135 actually includes a plurality of control valves. The control valves control the direction and flow rate of the hydraulic operating fluid supplied from the hydraulic pump 134 to corresponding hydraulic actuators such as the arm cylinders 123, the bucket cylinder 124, a fun-drive motor 22, etc. The control valve 135 is driven by operation signals from an arm control lever 11 and a bucket control lever 12 in the operating room 116 and a command signal from the controller 136. For example, the control valve 135 controls the flow of the hydraulic operating fluid to the arm cylinders 123 and the bucket cylinder 124 in response to the operation signals from the arm control lever 11 and the bucket control lever 12. In addition, the control valve 135 controls the flow of the hydraulic operating oil to the fan drive motor 22 in response to a command signal from the controller 136.

The above-mentioned fan drive motor 22 is used to drive a fan 21. The fan 21 produces cooling air to cool objects to be cooled. The objects to be cooed include a condenser 24 for cooling a refrigerant for an air conditioner, which is an air-conditioning unit for the operating room 116, a radiator 25 for cooling cooling-water for the engine 131, a hydraulic operating fluid cooler 34 (see FIG. 3) for cooling hydraulic operating fluid, and an intercooler 35 (see FIG. 3) for cooling air that is increased in temperature by being compressed by a supercharger of the engine 131. These condenser 24, radiator 25, hydraulic operating fluid cooler 34 and intercooler 35 are arranged between the engine 131 and the fan 21 in the engine room 117 as schematically illustrated in the top view of FIG. 3. The condenser 24 and the intercooler 35 are disposed on the side of the engine 131, whereas the hydraulic operating fluid cooler 34 and the radiator 25 are disposed on the side of the fan 21. The cooling air flowing in the forward direction during the normal-rotation drive of the fan 21 is produced as indicated by arrows in FIG. 3, taken in from the sides of engine room 117 and blows from the side of the condenser 24 and the intercooler 35 toward the hydraulic operating fluid cooler 34 and the radiator 25. In other words, under the cooling air flowing in the forward direction, the hydraulic operating fluid cooler 34 and the radiator 25 are located under the lee of the condenser 24, the intercooler 35 and the other objects to be cooled.

Returning to FIG. 2, the controller 136 is configured to include an arithmetic processing unit having a CPU, a ROM, a RAM and other peripheral circuits. The controller 136 receives respective signals outputted from an accelerator control input detector 143 for detecting the control input of an accelerator pedal 13; a vehicle speed detector 144 for detecting as vehicle speed the rotating speed of the output shaft of the transmission 133 (or a propeller shaft 141); a rotating speed detector 145 for detecting rotating speed Ni of the input shaft of the torque converter 132; a rotating speed detector 146 for detecting rotating speed Nt of the output shaft of the torque convertor 132; a forward/reverse changeover switch 14 for changing over the forward movement (F), reverse movement (R) and neutral (N) of the wheel loader 100; a gearset switch 15 for commanding the upper limit of the gearsets between first- to fourth-speeds; a kickdown switch 16 for commanding down-shift of the gearsets; a main mode-changeover switch 18 (hereinafter called "the main switch") for selecting any one of traveling modes of a power mode (hereinafter called "the P-mode") giving weight to workability and an economy mode (hereinafter called "the E-mode") giving weight to fuel consumption; a sub-mode-changeover switch 19 (hereinafter called "the sub-switch 19") for selecting any one of the P-mode and the E-mode; a hydraulic operating fluid temperature detector 26 for detecting the temperature of hydraulic operating fluid in the hydraulic operating fluid tank 23; a refrigerant pressure detector 27 for detecting the pressure of refrigerant flowing in the condenser 24; a torque converter oil temperature detector 29 for detecting the temperature of torque converter oil, which is a power transmission medium of the torque converter 132; a parking brake actuator 30 for actuating a parking brake device (not shown); a fan drive mode changeover switch 31 for changing over a fan drive mode (described later); a forced period setter 32 for setting the length of the forced reverse-rotation period (described later) of the fan 21; a changeover switch 36 for changing over the validity and invalidity of reverse-rotation stop processing (described later) for the fan 21; and the above-mentioned engine control unit 137.

The fan drive mode changeover switch 31 has three positions: "Automatic", "Manual" and "OFF". The position of the fan drive mode changeover switch 31 is shifted to "Automatic", "Manual" or "OFF" to switch the fan drive mode to an automatic mode, a manual mode or "OFF", respectively. Incidentally, "the automatic mode" means a fan drive mode in which the reverse-rotation drive of the fan 21 is automatically executed at regular time intervals. "The manual mode" means a fan drive mode in which when the fan drive mode changeover switch 31 is placed at "Manual", the fan 21 is driven for reverse rotation. When the position of the fan drive mode changeover switch 31 is shifted to "OFF", the fan 21 will not be driven for reverse rotation. The position of the fan drive mode changeover switch 31 may be placed at "Automatic" or "OFF" among the three positions. In such a case, even if an operator releases her or his hand from the fan drive mode changeover switch 31, the fan drive mode changeover switch 31 can be held at such a position. If the position of the fan drive mode changeover switch 31 is shifted to the "Manual" side, the fan drive mode changeover switch 31 is biased to the "OFF" side. If the operator releases her or his hand from the fan drive mode changeover switch 31, the position of the fan drive mode changeover switch 31 is returned to "OFF". As regards the forced period setter 32, a configuration is conceivable in which the forced period setter 32 per se is installed on the wheel loader 100. In addition, another configuration is conceivable in which the controller 136 is provided with a connecting portion to which the forced period setter 32 is connected and another device such as, for example, a personal computer or the like is connected as the forced period setter 32 to the controller 136.

The torque converter 132 has a function to increase output torque relative to input torque, i.e., a function to increase a torque ratio to 1 or more. The torque ratio decreases with an increase in torque converter speed ratio e (output rotating speed Nt/input rotating speed Ni), which is a ratio of the rotating speed of the output shaft of the torque converter 132 to that of the input shaft. For example, if a traveling load is increased during traveling at a constant engine rotating speed, the output rotating speed Nt, i.e., vehicle speed, of the torque converter 132 is reduced to reduce the torque converter speed ratio e. In this case, the torque ratio is increased; therefore, the vehicle can travel at greater traveling drive force (drag force). Specifically, if the vehicle speed is low, the traveling drive force is increased (low-speed and high-torque). If the vehicle speed is high, the traveling drive force is reduced (high-speed and low-torque).

The transmission 133 is an automatic transmission that has clutches and solenoid valves (not shown) which correspond to the gearsets of first- to fourth speeds. These solenoid valves are driven by control signals outputted from the controller 136 to the transmission control unit 138 to apply hydraulic fluid to a corresponding clutch to switch the clutch. The controller 136 previously stores a torque converter speed ratio e1 serving as a reference for upshift and a torque converter speed ratio e2 serving as a reference for downshift. In the automatic shifting mode, the controller 136 computes a torque converter speed ratio e on the basis of the signals from the rotating speed detectors 145, 146. If the speed ratio e thus computed is greater than the reference speed ratio e1, the controller 136 outputs an upshift signal to the transmission control unit 138. If the speed ratio e thus computed is smaller than the reference speed ratio e2, the controller 136 outputs a downshift signal to the transmission control unit 138. In this way, the gearsets of the transmission 133 are automatically changed between the first- to fourth-speeds in response to the torque converter speed ratio e.

In this case, the gearsets are automatically shifted taking, as an upper limit, the gearset selected by the gearset switch 15. For example, if the second-speed is selected by the gearset switch 15, the gearset is shifted to the first- or second-speed in response to the speed ratio e. If the first-speed is selected, the gearset is fixed at the first-speed. Incidentally, although particularly not illustrated, it is also conceivable to provide a function to shift from the above-mentioned automatic shifting mode to the manual shifting mode so that shifting to any gearset is achieved in the manual shifting mode by manually operating the gearset switch 15 or an additionally installed switch.

The kickdown switch 16 is a switch for forcibly shifting down the gearset. The controller 136 outputs a downshift signal to the transmission control unit 138 every time the kickdown switch is operated one time, thereby forcibly shifting down the gearset one by one regardless of the speed ratio e at that time. In the automatic shifting mode, for example, if the vehicle speed is low, the kickdown switch 16 is operated to make it possible to forcibly shift down the gearset.

In the above, if the torque converter speed ratio e crosses over the predetermined value e1 or e2, shifting is performed. However, it can be configured that if the vehicle speed reaches a predetermined value, shifting is performed. For example, this can be realized by the configuration in which an upshift signal or a downshift signal is outputted to the transmission control unit 138 in response to the signal from the vehicle speed detector 144.

The controller 136 controls engine rotating speed to a target engine speed according to the control input of the accelerator pedal 13. In other words, if the depression amount of the accelerator pedal 13 is increased, the target engine speed is increased. The controller 136 outputs the control signal corresponding to the target engine speed to the engine control unit 137 to control the engine rotating speed. On the other hand, the engine control unit 137 not only controls the engine 131 but fulfills a function to monitor the state of the engine 131. Specifically, the engine control unit 137 receives detection signals from a cooling water temperature detector 28 for detecting the temperature of engine cooling water flowing in the radiator 25 and an exhaust temperature detector (not shown) for detecting engine exhaust temperature. One of or both the detection values may reach respective preset values that have previously been set and it may be determined that the engine 131 has overheated or is at risk of overheat. In such a case, the engine control unit 137 outputs an overheat warning signal to the controller 136.

In this case, the controller 136 has a function to execute reverse-rotation stop processing in which the fan 21 is made to return to the normal-rotation drive if pressure P of an air conditioner refrigerant detected by the refrigerant pressure detector 27 reaches a previously set normal-rotation return pressure P1 during the reverse-rotation drive of the fan 21. The reverse-rotation stop processing is executable regardless of whether the fan drive mode (in other words, the changeover position of the above-mentioned fan drive mode changeover switch 31) relating to the reverse-rotation of the fan 21 is placed at "Automatic" or "Manual". However, the reverse-rotation processing may be made non-executable during the manual mode. However, in the present embodiment, the reverse-rotation stop processing is not executed if the fan drive mode (the position of the fan drive mode change-over switch 31) is placed at "OFF" so that the fan 21 is not driven for reverse rotation, or if the reverse-rotation stop processing is invalidated by the changeover switch 36.

In the present embodiment, during the reverse-rotation drive of the fan 21, forced reverse-rotation processing is executed by the controller 136 before the execution of the reverse-rotation stop processing. The forced reverse-rotation processing means processing in which the reverse-rotation drive of the fan 21 is made to continue regardless of the value of the refrigerant detection pressure P until a predetermined forced reverse-rotation period t1 elapses after the reverse-rotation of the fan 21 has been started. Specifically, as long as the position of the fan drive mode changeover switch 31 is not placed at "OFF", even if the refrigerant detection pressure P reaches the normal-rotation return pressure P1 once the fan 21 starts the reverse-rotation drive, the fan 21 continues the reverse-rotation drive before the elapse of the forced reverse-rotation period t1.

Incidentally, if the automatic mode is selected as the fan drive mode, the automatic reverse-rotation processing is executed. The automatic reverse-rotation processing means processing in which the fan 21 is driven for reverse rotation for the preset reverse-rotation drive period t2 (>the forced reverse-rotation period t1) at regular time intervals (e.g. about 60 or 90 minutes). In the present embodiment, the controller 136 sequentially executes the forced reverse-rotation processing and the reverse-rotation stop processing during the execution of the automatic reverse-rotation processing. After the start of the reverse rotation, although the controller 136 executes both the processing, the reverse-rotation drive period t2 elapses with the fan 21 remaining driven for reverse-rotation. In such a case, the controller 136 returns the fan 21 to the normal-rotation drive.

In the present embodiment, further, if the fan drive mode is the automatic mode, processing for returning the fan 21 to the normal-rotation drive is executed, in parallel with the forced reverse-rotation processing and the reverse-rotation stop processing, on the basis of input signals from the hydraulic operating fluid temperature detector 26, the torque converter oil temperature detector 29 and the engine control unit 137. More specifically, any one of respective detection values Ta and Tb of the hydraulic operating fluid temperature detector 26 and the torque converter oil temperature detector 29 may reach their preset values Ta1 and Tb2, respectively. Alternatively, the controller 136 may receive the overheat warning signal of the engine 131 from the engine control unit 137. In such cases, during the reverse-rotation drive of the fan 21, the controller 136 is designed to forcibly return the fan 21 to the normal-rotation drive regardless of the elapse time t after the start of the reverse rotation of the fan 21 and the value of the detection pressure P of the air conditioner refrigerant (regardless of whether the forced reverse period t1 does not elapse or the detection pressure P of the air conditioner refrigerant is equal to or lower than the normal-rotation return pressure P1).

A description is next given of the operation of the wheel loader configured as above.

1. Basic Operation

Figure 4:
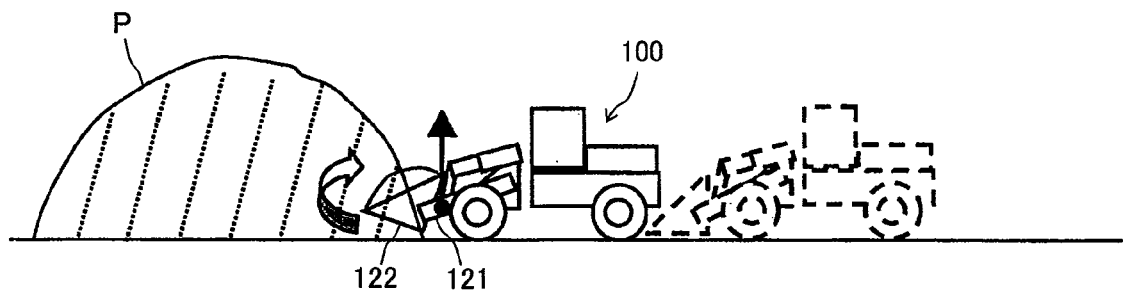
FIG. 4 is a schematic view illustrating the behavior of dug object scooping work at the time of loading dirt, gravel or other dug objects in a dump truck, as an example of a typical action of the wheel loader as an example of the construction machine according to the embodiment of the present invention.

FIG. 4 is a schematic view illustrating work for scooping dirt, gravel or other dug objects in loading them on a dump track or the like, as an example of the typical operation of the wheel loader 100.

As illustrated in FIG. 4, when scooping dug objects, the wheel loader 100 typically moves forward toward a mound P of the dug objects (hereinafter simply called "the mound P") at e.g. about second-speed and approaches the mound P. In this case, the traveling mode is set at the E-mode by the main switch 18. The arm control lever 11 and the bucket control lever 12 are subsequently operated to lower the arms 121, thereby directing the opening of the bucket 122 forward. In addition, immediately before the bucket 122 enters the mound P, the kickdown switch 16 is depressed to perform the kickdown operation from the second-speed to the first-speed. The reason for the kickdown operation to the first-speed is that large traveling drive force is required to load the dug objects in the bucket 122.

After the bucket 122 enters the mound P, a detent mechanism (not shown) of the arm control lever 11 is used to hold the arm-raising action. This continues the arm-raising action even if a hand is released from the arm control lever 11. During the arm-raising action, the bucket control lever 12 is operated to allow the bucket 122 to perform crowding action, thereby scooping the dug objects therein. When the dug objects are to be scooped, the traveling drive force (the drag force) is adjusted by the degree of the depression of the accelerator pedal 13. In this case, during the work for scooping the dug objects, there are cases where it is preferred that the traveling drive force be not increased more than necessary and where greater traveling drive force is required, depending on the property of the dug objects or the conditions of a road surface. An operator judges a situation to switch between the E-mode and the P-mode on a timely basis, so that dug objects are scooped in the bucket 122 while avoiding the hollowing of the road surface due to slippage. In this way, the dug objects are loaded in the bucket 122. The forward/reverse movement changeover switch 14 is then operated to change the traveling direction to the back and the wheel loader moves backward and away from the mound P. The wheel loader changes the traveling direction to the forward again and moves close to the dump track (not shown). The arm control lever 12 and the bucket control lever 12 are operated to dump the dug objects on the back or the like of the dump track.

2. Fun Control Operation

Figure 5:
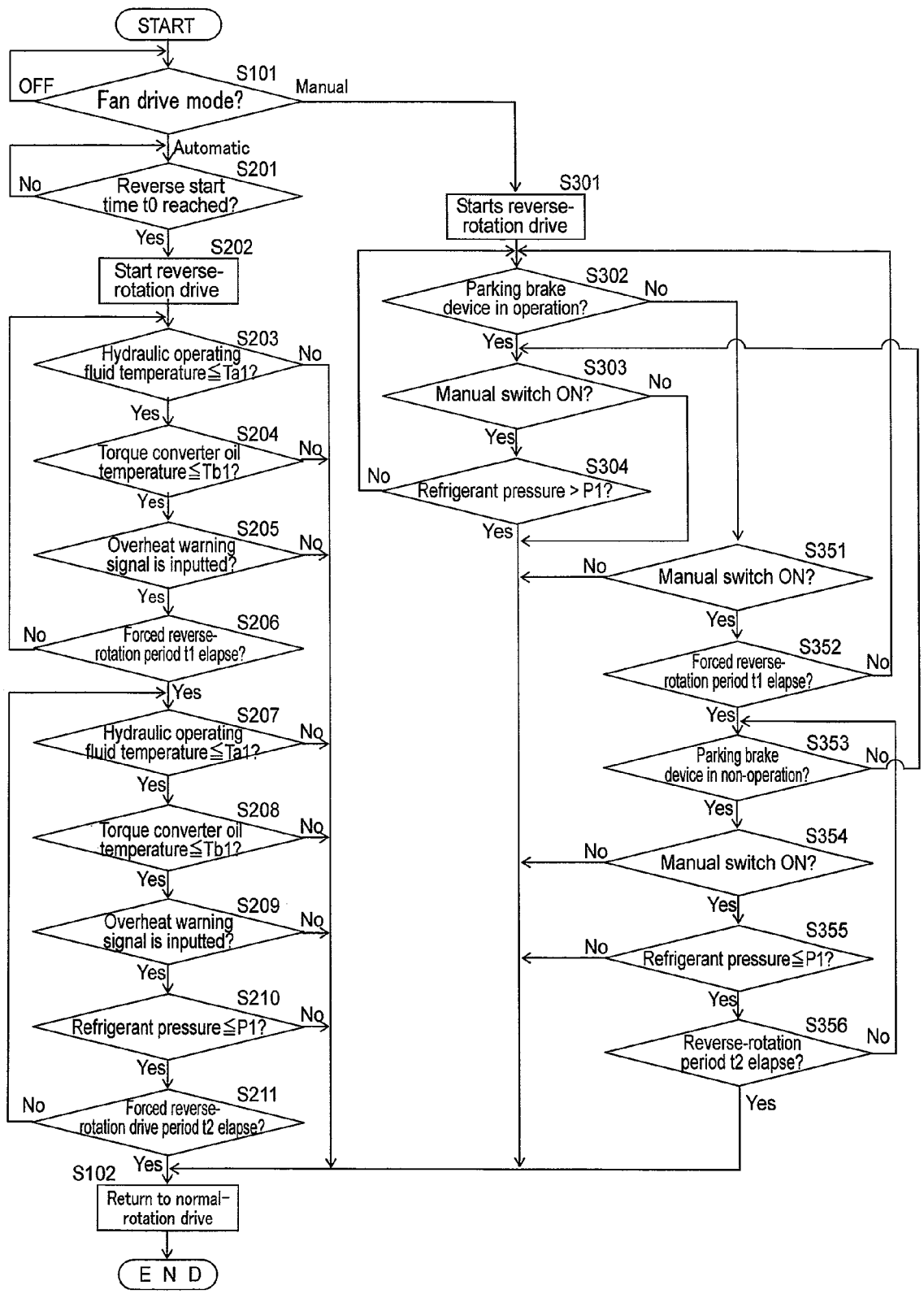
FIG. 5 is a flowchart showing procedure for fan drive control using a controller incorporated in the wheel loader as an example of the construction machine according to the embodiment of the present invention.

FIG. 5 is a flowchart showing a procedure for the above-described drive control of the fan 21 by the controller 136.

(1) Fun Drive Mode Determination

The controller 136 determines which position of "OFF", "Automatic" and "Manual" is selected as the fan drive mode during the drive of the engine 131 (S101). If the fan drive mode changeover switch 31 is placed at the position of "OFF" and the reverse-rotation stop processing of the fan 21 is invalidated, the controller 136 does not shift the procedure to the next procedure but repeatedly executes the processing of S101 (a standby state). On the other hand, if the fun drive mode changeover switch 31 is placed at the position of "Automatic" to select the automatic mode, the controller 136 shifts the procedure to S201. If the fan drive mode changeover switch 31 is placed at the position of "Manual" to select the manual mode, the controller 136 shifts the procedure to S301.

(2) Automatic Mode
(S201, S202)

Figure 3:
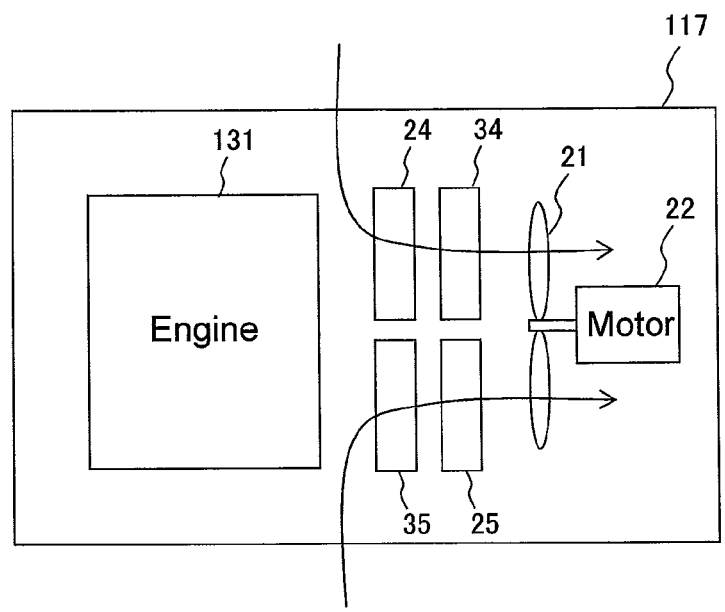
FIG. 3 is a schematic top view illustrating the arrangement of components housed in an engine room incorporated in the wheel loader as an example of the construction machine according to the embodiment of the present invention.

If the procedure is shifted to the automatic mode, the controller 136 first determines whether or not the preset period (60 minutes, 90 minutes or the like) elapses after the shifting to the automatic mode (or from the previous reverse-rotation drive after the shifting to the automatic mode) and the reverser-rotation start time t0 is reached (S201). The procedure of S201 is repeated before the reverse-rotation start time t0 is reached. When the reverse-rotation start time t0 is reached, the controller 136 shifts the procedure to S202. In S202, a command signal indicating the reverse rotation of the fan 21 is outputted to the control valve 135, whereby the fan drive motor 22 is switched from the normal-rotation drive to the reverse-rotation drive. In this way, the fan 21 is switched from the normal-rotation drive to the reverse-rotation drive. If the fan 21 is driven for reverse rotation, the direction of the cooling air illustrated in FIG. 3 is changed (the cooling air flows backward), so that the condenser 24 and the intercooler 35 are changed to under the lee of the radiator 25 and the hydraulic operating fluid cooler 34.

(S203-S206)

The processing in S203 to S206 corresponds to the forced reverse-rotation processing. In S203, it is determined whether or not the hydraulic operating fluid temperature Ta detected by the hydraulic operating fluid detector 26 is equal to or lower than the preset value Ta1 (an upper limit of a normal temperature range or a value lower than the upper limit by a predetermined allowance value) for the hydraulic operating fluid temperature Ta. If the hydraulic operating fluid temperature Ta is equal to or lower than the preset value Ta1, the procedure is shifted to S204. In S204, it is similarly determined whether or not the torque converter oil temperature Tb detected by the torque converter oil temperature detector 29 is equal to or lower than a preset value Tb1 (an upper limit of a normal temperature range or a value lower than the upper limit by a predetermined allowance value) for the torque converter oil temperature Tb. If the torque converter oil temperature Tb is equal to or lower than the preset value Tb1, the procedure is shifted to S205. In S205, it is determined whether or not the above-mentioned overheat warning signal is inputted from the engine control unit 137. If the overheat warning signal is not inputted, the procedure is shifted to S206. In S206, it is determined whether or not the forced reverse-rotation period T1 elapses after the start of the reverse rotation of the fan 21 (i.e., from the reverse-rotation start time t0). If the forced reverse-rotation period t1 does not elapse, the procedure is returned to S203. If the forced reverse-rotation period t1 elapses, the procedure is shifted to S207. The refrigerant pressure P of the air conditioner is not determined during S203 to S206; therefore, as long as the determinations in S203 to S206 are satisfied, the fan 21 is continuously driven for reverse rotation during the forced drive period t1 regardless of the value of the refrigerant pressure P.

On the other hand, if none of the determinations in S203 to S205 are not satisfied before the elapse of the forced reverse-rotation period t1, the controller 136 shifts the procedure to S102 at the time when none of the determinations are satisfied and ends the procedures in FIG. 5 after the processing in S102. In S102, a command signal indicating the normal rotation of the fan 21 is outputted to the control valve 135, whereby the fan drive motor 22 is switched from the reverse-rotation drive to the normal-rotation drive. In this way, the fan 21 is returned to the normal-rotation drive.

Incidentally, the processing in S203 to S205 may be in a random order.

(S207-S211)

The processing in S207 to S211 corresponds to the reverse-rotation stop processing. Among the processing in S207 to S211 the processing in S207 to S209 is the same as that in S203 to S205. If none of determinations in S207 to S209 are satisfied, the controller 136 shifts the procedure to S102 and ends the procedures in FIG. 5. If all the determinations in S207 to S209 are satisfied, the controller 136 shifts the procedure to S210. In S210, it is determined whether or not the refrigerant pressure P detected by the refrigerant pressure detector 27 is equal to or lower than the normal-rotation return pressure P1 (an upper limit in a normal pressure range or a value lower than the upper limit by a predetermined allowance value), which is a preset value for the refrigerant pressure P. If the refrigerant pressure P is higher than the normal-rotation return pressure P1, the controller 136 shifts the procedure to S102 and ends the procedures in FIG. 5. If the refrigerant pressure P is equal to or lower than the normal-rotation return pressure P1, the procedure is returned to S211. In S211, it is determined whether or not the reverse-rotation drive period t2 (>the forced reverse rotation period t1) elapses after the start of the reverse rotation of the fan 21 (i.e., from the reverse-rotation start time t0). If the reverse-rotation drive period t2 does not elapse, the procedure is returned to S207. If the reverse-rotation drive period t2 elapses, the procedure is shifted to S102, in which the fan 21 is returned to the normal-rotation drive, and the procedures in FIG. 5 are ended.

Unlike the processing (the forced reverse-rotation processing) in S203 to S206 before the elapse of the previous forced reverse-rotation period t1, in the processing (the reverse-rotation stop processing) in S207 to S211, the refrigerant pressure P of the air conditioner is determined. Even if the determinations in S207 to S209 are satisfied, the fan 21 is returned to the normal-rotation drive at the time when the refrigerant pressure P reaches the normal-rotation return pressure P1.

Incidentally, the processing in S207 to S210 may be in a random order.

(3) Manual Mode
(S301-S303)

In S101 if the fan drive mode is determined to be the manual mode (if the fan drive mode change-over switch 31 is placed at the position of "Manual"), the controller 136 determines whether or not the position of the fan drive mode changeover switch 31 is switched from "Manual" (whether or not the indication of the manual reverse-rotation is released) (S301). If the position of the fan drive mode changeover switch 31 is switched to "OFF" and the indication of manual reverse-rotation is released, the controller 136 returns the procedure to S101. If the indication of manual reverse-rotation continues with the position of the fan drive mode changeover switch 31 remaining placed at "Manual", the controller 136 shifts the procedure to S302 and switches the fan 21 from the normal-rotation drive to the reverse-rotation drive similarly to S202. In S303, it is subsequently determined whether or not the parking brake device is operated based on the signal of the parking brake actuator 30. If the parking brake device is in operation, the procedure is shifted to S304. If the parking brake device is not in operation, the procedure is shifted to S351.

(S304, S305)

If the parking brake device is in operation, the controller 136 determines whether or not the position of the fan drive mode changeover switch 31 is switched from "Manual" (whether or not the indication of the manual reverse-rotation is released) (S304). If the indication of manual reverse-rotation continues with the position of the fan drive mode changeover switch 31 remaining placed at "Manual", the procedure is shifted to S305. If the position of the fan drive mode changeover switch 31 is switched to "OFF" or "Automatic" and the indication of manual reverse-rotation is released, the procedure is shifted to S102, in which the fan 21 is returned to the normal-rotation drive, and the procedures in FIG. 5 are ended. In S305, it is determined whether or not the refrigerant pressure P detected by the refrigerant pressure detector 27 is higher than the normal-rotation return pressure P1. If the refrigerant pressure P is equal to or lower than the normal-rotation return pressure P1, the procedure returns to S303 with the reverse-rotation drive of the fan 21 remaining continued. On the other hand, if the refrigerant pressure P is higher than the normal-rotation return pressure P1, the controller 136 shifts the procedure to S102, in which the fan 21 is returned to the normal-rotation drive, and the processing in FIG. 5 is ended.

(S351, S352)

If the parking brake device is not in operation, the controller 136 shifts the procedure from S303 to S351. After the execution of the forced reverse-rotation processing, if a certain period of time (the reverse-rotation drive period t2 is set in the present embodiment; however, the period of time may be different from the reverse-rotation drive period t2 as long as it is longer than the forced reverse-rotation period t1) elapses, the fan 21 is returned to the normal-rotation drive. S351 and S352 among the above processing correspond to the forced reverse-rotation processing.

In S351, the controller 136 first determines whether or not the position of the fan drive mode changeover switch 31 is switched from "Manual" (whether or not the indication of the manual reverse-rotation is released). If the position is switched to "OFF" or "Automatic" and the indication of the manual reverse-rotation is released, the procedure is shifted to S102, in which the fan 21 is returned to the normal-rotation drive, and the procedures in FIG. 5 are ended. On the other hand, if the position remains placed at "Manual" and the indication of manual reverse-rotation continues, the procedure is shifted to S352. In S352, it is determined whether or not the forced reverse-rotation period t1 elapses after the start of the reverse-rotation of the fan 21 (that is, after the time when the position of the fan drive mode changeover switch 31 is placed at "Manual"). If the forced reverse-rotation period t1 does not elapse, the procedure is returned to S302. If the forced reverse-rotation period t1 elapses, the procedure is shifted to S353. Thus, during the non-operation of the parking brake device, until the forced reverse-rotation period t1 elapses after the start of the manual reverse-rotation, the fan 21 continues the reverse-rotation drive as long as the position of the fan drive mode changeover switch 31 remains placed at "Manual".

(S353-S356)

In S353, it is subsequently determined whether or not the parking brake device is in the non-operational state. If the parking brake device is switched to the operational state, the procedure is shifted to S303 mentioned earlier. If the parking brake device is not in operation continuously, the procedure is shifted to S354. In S354, the controller 136 determines whether or not the position of the fan drive mode changeover switch 31 is switched from "Manual" (whether or not the indication of the manual reverse-rotation is released). If the position is switched to "OFF" or "Automatic" to release the indication of manual reverse-rotation, the procedure is shifted to S102, in which the fan 21 is returned to the normal-rotation drive, and the procedures in FIG. 5 are ended. If the reverse rotation is continuously indicated, the procedure is shifted to S355. In S355, the controller 136 determines whether or not the refrigerant pressure P detected by the refrigerant pressure detector 27 is equal to or lower than the normal-rotation return pressure P1. If the refrigerant pressure P is higher than the normal-rotation return pressure P1, the procedure is shifted to S102, in which the fan 21 is returned to the normal-rotation drive, and the processing in FIG. 5 is ended. If the refrigerant pressure P is equal to or lower than the normal-rotation return pressure P1, the procedure is shifted to S356. In S356, the controller 136 determines whether or not the reverse-rotation drive period t2 (>the forced reverse-rotation period t1) after the start of the reverse rotation of the fan 21 elapses. If the reverse-rotation drive period t2 does not elapse, the procedure is returned to S353. If the reverse-rotation drive period t2 elapses, the procedure is shifted to S102, in which the fan 21 is returned to the normal-rotation drive, and the procedures in FIG. 5 are ended.

During the drive of the engine 131, the controller 136 repeatedly executes the above procedures in FIG. 5 to control the operation of the fan 21 in accordance with the fan drive mode.

Incidentally, as described earlier, the reverse-rotation stop processing of the fan 21 can be invalidated (turned off) by the changeover switch 36. Although not illustrated to prevent the complication of the drawing, if the reverse-rotation stop processing is invalidated by the changeover switch 36, for example, processing may be executed as below. (a) For the automatic mode, the reverse-rotation drive of the fan 21 is started according to e.g. the procedure in S202 and then the validity or invalidity of the reverse-rotation stop processing is determined. If the reverse-rotation processing is invalidated, the controller 136 needs only to sequentially execute the procedures corresponding to S207 to S209 and S211. Specifically, while monitoring the hydraulic operating fluid temperature Ta, the torque converter oil temperature Tb and the overheat warning signal, the fan 21 is driven for reverse rotation for the reverse-rotation drive period t2 (the procedures corresponding to S203 to S206 and S210 are omitted). (b) For the manual mode, the procedures corresponding to S302 and S303 or the procedures corresponding to S302, S351 and S356 (however, before the elapse of the reverse-rotation drive period t2, S356→S302) need only to be sequentially executed.

The present embodiment produces the following functions and effects.

(1) Compatibility Between Cleaning Performance and the Cooling Effect of the Air Conditioner If the fan 21 is driven for reverse rotation, reverse cooling air blows away the dust that has adhered to the radiator 25, the hydraulic operating fluid cooler 34, the condenser 24, a filter for dust removal and other objects to be cooled, not shown, by forward cooling air during the normal-rotation drive. This can reduce the burden of cleaning the inside of the engine room 117. On the other hand, the condenser 24 for cooling the refrigerant for the air conditioner is under the lee of the radiator 25, the hydraulic operating fluid cooler 34 and other objects to be cooed as described earlier. Therefore, air hitting the condenser 24 is increased in temperature, which may probably degrade the effect of the air conditioner.

While executing the reveres-rotation drive of the fan 21, the refrigerant pressure P of the air conditioner may abruptly be increased to the normal-rotation return pressure P1 by the reverse-rotation drive. In the present embodiment, the fan 21 is forcibly returned to the normal-rotation drive even before the reverse-rotation drive period t2 elapses or before the reverse-rotation drive is manually ended. Thus, while reducing the burden of cleaning the engine room 117, the lowering of the cooling effect of the air conditioner can be suppressed.

In particular, the fan 21 is made to be reversely rotated regardless of the refrigerant pressure P until the forced reverse-rotation period t2 elapses as illustrated in FIG. 5. In such a case, it is easy to ensure the minimum reverse-rotation action of the fan 21 in order to produce the effect of reducing the burden of cleaning. Thus, it is possible to prevent the biased operation giving excessive weight to the performance of the air conditioner.

(2) Suppression of Intermittent Running of the Air Conditioner

Air conditioners have a protection circuit in some cases to stop their operation when refrigerant pressure reaches a certain value (here, called the first value). In this case, on the basis of the setting of the air conditioner side, unless an engine is once stopped and restarted, an air conditioner is not operative, so that work has to be interrupted to restart the air conditioner in some cases. To avoid this, it is conceivable to incorporate the following function. A value (here, called a second value) lower than the above-mentioned value at which the protection circuit operates is set on the construction machine side. If the refrigerant pressure reaches the second value, the construction machine side temporarily stops the air conditioner and waits for lowered refrigerant pressure. Then, the air conditioner is made to operate (or permitted to operate). In such a case, if it is designed not to determine the refrigerant pressure during the reverse-rotation drive of the fan 21, the above-mentioned function to stop the air conditioner tends to operate during the reverse-rotation drive of the fan 21 in which the refrigerant pressure tends to increase. Thus, the air conditioner is likely to operate intermittently depending on the environment such as temperature of a working site.

On the other hand, in the present embodiment, if the refrigerant pressure P exceeds the normal-rotation return pressure P1, the fan 21 is returned to the normal-rotation drive to cool the condenser 24. Thus, if the setting of the normal-rotation pressure P1 is made appropriate, the intermittent operation of the air conditioner can be suppressed.

In operation, the hydraulic operating fluid cooler 34 and the radiator 25 are increased in temperature; therefore, the condenser 24 is more likely to increase in temperature by the reverse-rotation drive of the fan 21 than not in operation. Therefore, it is difficult in some cases to reversely rotate the fan 21 during the operation depending on the temperature environment or the like conceivable in the working site. On the other hand, the present embodiment can suppress an excessive increase in the refrigerant pressure P; therefore, it is easy for the fan 21 to be driven for reverse rotation even in operation.

(3) Ensuring of Flexibility of Setting

The above-mentioned forced reverse-rotation period t1 can be adjusted by the forced period setter 32. Therefore, it is possible to flexibly adjust the setting of the forced reverse-rotation period t1 in accordance with the temperature environment or the like in the working site. Thus, the setting of the forced reverse-rotation period t1 can flexibly be dealt with taking into account a balance between cleaning performance and an effect of cooling the air conditioner.

(4) Ensuring of Selective Flexibility by an Operator

The validity and invalidity of the reverse-rotation stop processing of the fan 21 can be switched by the changeover switch 36. Therefore, for example, an operator who wants good cleaning performance even if the effect of the air conditioner gets worse invalidates the reverse-rotation stop processing by means of the changeover switch 36. It is easy, therefore, to ensure the sufficient period for the reverse-rotation operation of the fan 21 even if the refrigerant pressure P is increased. Thus, the operation giving weight to maintenance performance can be chose. On the other hand, if the greater weight is given to the comfort in the operating room 116 than to the cleaning performance, the reverse-rotation stop processing is validated by the changeover switch 36. If the refrigerant pressure p rises, the fan 21 is returned to the normal rotation, thereby suppressing the lowering of the cooling effect of the air conditioner. In this way, the operation giving weight to the comfort can be selected. Further, if switching is made to the manual mode, it is easy to ensure the longer period for the reverse rotation of the fan 21.

Incidentally, the above embodiment describes, as an example, the case where the forced reverse-rotation processing is executed before the reverse-rotation stop processing. However, the program of the forced reverse-rotation processing may be omitted in some situations. The same operation as the case of omitting the program of the forced reverse-rotation processing can be executed also by setting the forced reverse-rotation period t1 at 0 (zero).

In the procedures in FIG. 5, the case is exemplified where the hydraulic operating fluid temperature Ta and the torque converter oil temperature Tb are not determined during the manual mode. However, the processing corresponding to S203 to S205 may be executed, for example, between the processing in S303 and S304, between the processing in S351 and S352, or between the processing in S354 and S355. It is designed that the procedure is shifted to the procedures in S303 and S304 or in S351 to S356 depending on the operation or non-operation of the parking brake device. However, if the operation or non-operation of the parking brake device is not taken into account, the procedures in S302 to S304 may be omitted and the procedure may be shifted from S301 to S351. Alternatively, the procedures in S302, and S351 to S356 may be shifted and the procedure may be shifted from S301 to S303. The reason why the control is changed depending on the operation or non-operation of the parking brake device is based on the following concept. During non-operation of the parking brake device, there is a situation where the wheel loader can be driven for work (if the fan 21 is reversely rotated, the condenser 24 tends to increase in temperature). Therefore, it is preferable to adopt the control concepts of the forced reverse-rotation period t1 and the reverse-rotation drive period t2. On the other hand, during the operation of the parking brake device, the wheel loader is not driven for work (even if the fan 21 is reversely rotated, the condenser 24 tends not to increase in temperature). Therefore, it is preferable that the reverse-rotation period of the fan 21 be not limited by the forced reverse-rotation period t1 or the reverse-rotation drive period t2 but be left up to operator's discretion.

In the above-mentioned embodiment, the fan drive mode changeover switch 31 is placed at "Manual" to indicate the reverse-rotation drive of the fan 21. In this way, the mode selection also serves as the indication of the reverse rotation; however, both may be separated from each other. For example, the fan drive mode changeover switch 31 is configured to keep its position even if it is placed at "Manual". The switching of the fan drive mode changeover switch 31 to "Manual" serves only as the operation for selecting the manual mode. To select the manual mode, an additionally installed switch for indicating the manual reverse rotation is operated to indicate the reverse-rotation drive of the fan 21. In short, the fan drive mode is set at the manual mode, thereby validating the operation of the switch for indicating manual reverse-rotation. The configuration as above may be possible.

The above embodiment exemplifies the case where the hydraulic operating fluid detector 26 is installed in the hydraulic operating fluid tank 23. However, the hydraulic operating fluid detector 26 may be installed at another position in a passage for hydraulic operating fluid. Also the installation location of the refrigerant pressure detector 27 is not limited to the condenser 24. The refrigerant pressure detector 27 may be installed at another location in a passage for air conditioner refrigerant. The fan 21 is designed to be hydraulically driven; however, the present invention may be applied to the case where the fan 21 is electrically driven. Further, the description is given as an example of the case where the present invention is applied to the wheel loader. However, the present invention can be applied to hydraulic excavators and other construction machines.

EXPLANATION OF REFERENCE NUMERALS

21 Fan
24 Condenser
25 Radiator (other objects to be cooled)
26 Hydraulic operating fluid temperature detector
27 Refrigerant pressure detector
29 Torque converter oil temperature detector
32 Forced period setter
34 Hydraulic operating fluid cooler (other objects to be cooled)
36 Changeover switch (changeover means)
100 Wheel loader (construction machine)
123 Arm cylinder (hydraulic actuator)
124 Bucket cylinder
131 Engine
132 Torque converter
134 Hydraulic pump
136 Controller
137 Engine control unit
141 Transmission
P Detection pressure
P1 Normal-rotation return pressure
t1 Forced reverse-rotation period
t2 Reverse-rotation drive period
Ta Hydraulic operating fluid temperature
Ta1 Preset value
Tb Torque converter oil temperature
Tb1 Preset value

The invention claimed is:

1. A construction machine comprising:
a vehicle body;
a work implement mounted on a front of the vehicle body;
an operating room mounted on the vehicle body;
an engine room disposed on a side of the operating room, where the engine room houses:
a condenser to cool a refrigerant for an air conditioner,
a fan to cool the condenser with forward cooling air produced during normal-rotation driving,
another cooled object disposed under the lee of the forward cooling air with respect to the condenser,
a refrigerant pressure detector to detect a pressure of a refrigerant flowing in the condenser; and
a controller configured to execute reverse-rotation stop processing for returning the fan to normal-rotation driving when the pressure of the refrigerant detected by the refrigerant pressure detector reaches a preset normal-rotation return pressure during reverse-rotation driving of the fan.

2. The construction machine according to claim 1, wherein the controller executes, before the execution of the reverse-rotation stop processing, forced reverse-rotation processing for continuing the reverse-rotation driving of the fan regardless of the detected pressure of the refrigerant until a predetermined forced reverse-rotation period elapses after the reverse-rotation driving of the fan has been started.

3. The construction machine according to claim 2, wherein the controller is further configured to execute automatic reverse-rotation processing in which the fan is driven for reverse rotation for a preset reverse-rotation period at regular time intervals, and during the execution of the automatic reverse-rotation processing, the controller sequentially executes the forced reverse-rotation processing and the reverse-rotation stop processing and returns the fan to the normal-rotation driving after the reverse-rotation drive period elapses with the fan remaining driven for reverse rotation.

4. The construction machine according to claim 2, comprising;
a forced period setter for setting the forced reverse-rotation period or a connecting portion to which the forced period setter is connected.

5. The construction machine according to claim 2, comprising:
changeover means for changing over validity and invalidity of the reverse-rotation stop processing.

6. The construction machine according to claim 2, further comprising:
an engine housed by the engine room;
a hydraulic pump to drive the engine;
a hydraulic actuator driven by hydraulic operating fluid delivered from the hydraulic pump;
a hydraulic operating fluid temperature detector to detect a temperature of the hydraulic operating fluid;
a transmission to change vehicle speed;
a torque converter to transmit a drive force of the engine to the transmission;
a torque converter oil temperature detector to detect a temperature of torque converter oil, which is a power transmission medium of the torque converter;
a radiator as the other cooled object housed by the engine room, to cool water for the engine; and
an engine control unit configured to execute control of and monitor the engine,
wherein the controller returns the fan to the normal-rotation driving regardless of elapsed time after the start of the reverse rotation driving of the fan or the detected pressure of the refrigerant if any one of detected values of the hydraulic operating fluid temperature detector and the torque converter oil temperature detector reaches a corresponding one of respective preset values, or, if the controller receives a signal warning of overheating of the engine from the engine control unit, during the reverse-rotation drive of the fan.

7. The construction machine according to claim 2, further comprising:
a parking brake actuator to actuate a parking brake device,
wherein the controller executes the forced reverse-rotation processing if the parking brake device is not in operation, before the execution of the reverse-rotation stop processing, until the forced reverse-rotation period elapses after the reverse-rotation driving of the fan has been started.

* * * * *